No. 740,291.

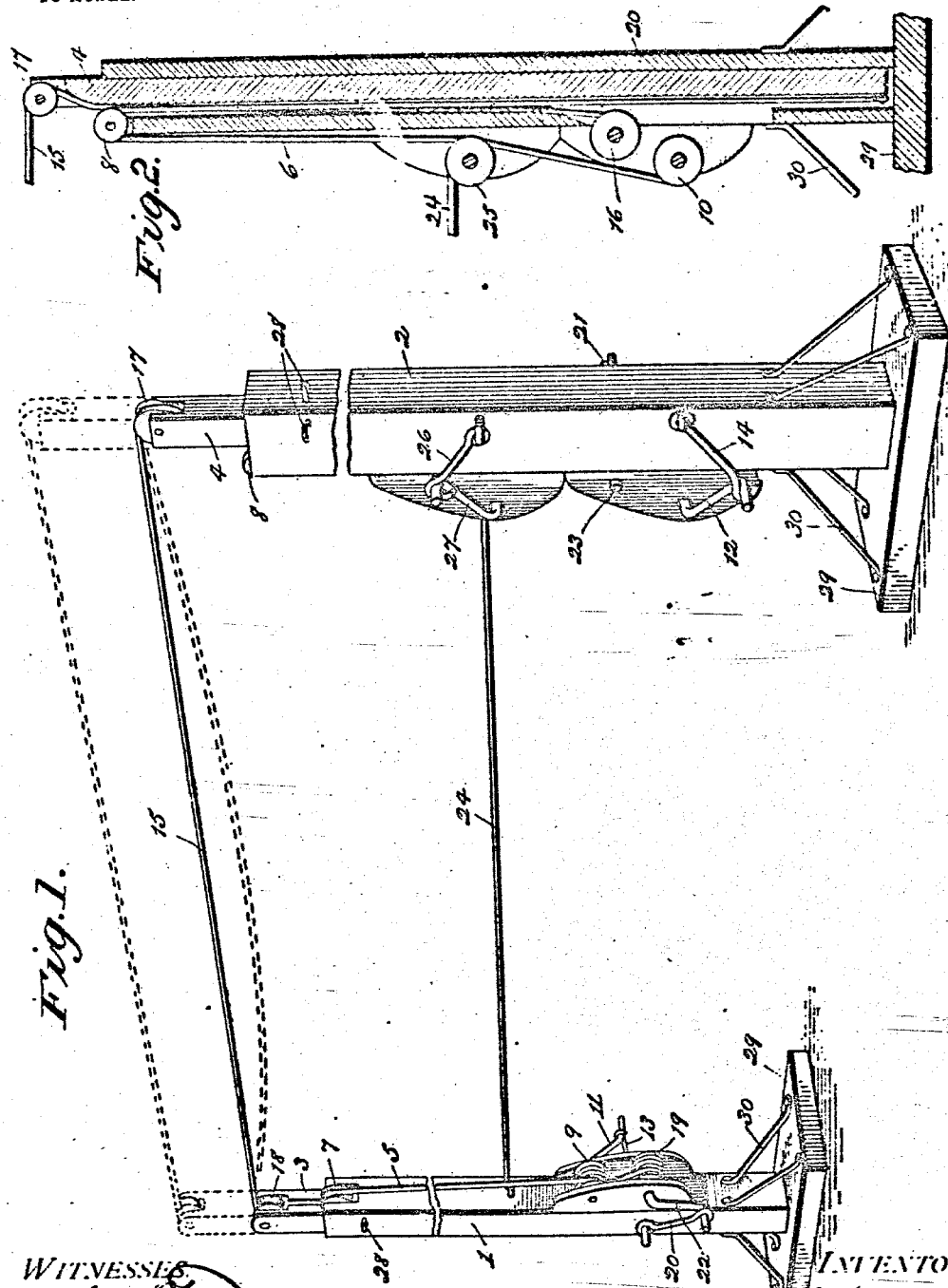

Patented September 29, 1903.

UNITED STATES PATENT OFFICE.

THOMAS BRUSTER LEE, OF CATLETTSBURG, KENTUCKY, ASSIGNOR OF ONE-HALF TO LABAN T. EVERETT, OF CATLETTSBURG, KENTUCKY.

CLOTHES-LINE AND CURTAIN-STRETCHER.

SPECIFICATION forming part of Letters Patent No. 740,291, dated September 29, 1903.

Application filed January 15, 1903. Serial No. 139,154. (No model.)

*To all whom it may concern:*

Be it known that I, THOMAS BRUSTER LEE, a citizen of the United States, residing at Catlettsburg, in the county of Boyd and State of Kentucky, have invented certain new and useful Improvements in Clothes-Lines and Curtain-Stretchers; and I do declare the following to be a full, clear, and exact description of the invention, such as will enable others skilled in the art to which it appertains to make and use the same, reference being had to the accompanying drawings, and to the figures of reference marked thereon, which form a part of this specification.
My invention relates to clothes-lines and curtain-stretchers, and has for its object to provide a device of this class which is particularly simple in construction, easy of operation, and composed of a minimum number of parts.

With this object in view my invention consists in the novel construction and arrangement of my clothes-line.

My invention also consists in certain other novel features of construction and in combination of parts, which will be first fully described and afterward specifically pointed out in the appended claims.

Referring to the accompanying drawings, Figure 1 is a perspective view of my invention in an operative position. Fig. 2 is a vertical sectional view of one of the uprights.

Like numerals of reference indicate the same parts throughout the several figures, in which—

1 and 2 indicate the uprights, which are hollow in their interiors and within which the movable uprights 3 and 4 are carried.

5 and 6 indicate cables which are secured to the lower ends of the movable uprights 3 and 4 and which pass upwardly and over pulleys or rollers 7 and 8, located at the tops of the hollow uprights 1 and 2.

9 and 10 indicate drums which are secured to the uprights 1 and 2, and 11 and 12 indicate cranks therefor, the cables 5 and 6 being adapted to be wound on said drums, and the hooks 13 and 14, which are secured to uprights 1 and 2, are adapted to engage said cranks to hold the same.

15 indicates a cable or line which passes around the drum 16 on the upright 2 and up and over a pulley 17 at the top of the movable upright 4 and across to and over the pulley 18 on the movable upright 3, thence down and around the drum 19 on the upright 1. Hooks 20 and 21 on uprights 1 and 2 engage the cranks 22 and 23 of said drums 19 and 16 to hold said drums, the hooks and cranks of both drums being of the same construction.

24 indicates a line or cable which is secured to the upright 1 and to the drum 25 on the upright 2. A hook 26 engages the crank 27 thereof to hold the same. At the tops of said uprights 1 and 2 I provide hooks or staples 28 for the purpose of fastening guy-lines thereto in order to support the uprights, and I show bases 29 and braces 30 for said uprights, although when desired the uprights may be so constructed as to be driven into the ground.

Having thus described the several parts of my invention, its operation is as follows: When it is desired to hang clothes, curtains, or other articles upon the line 15, the hooks 13 and 14 are disengaged from the cranks 11 and 12 of the drums 9 and 10 and said drums are revolved, so that the lines or cables 5 and 6 are unwound therefrom. This causes the movable uprights 3 and 4 to be lowered, as shown in Fig. 1, so that the said line may be easily accessible. The lowering of said uprights obviously causes a slack in said line 15. The clothes, curtains, &c., having been hung, said drums 9 and 10 are revolved, so as to wind the cables 5 and 6, which raises the uprights to the desired position, and the hooks 13 and 14 are made to engage the cranks 11 and 12 to hold the same. The drums 16 and 19 are then revolved, so as to wind the line 15, which tightens the same. The line 24 cannot be raised, but is simply for the purpose of stretching curtains and making an additional clothes-line.

In order to stretch a curtain, the lower edge thereof is secured to the lower line 24 and the upper edge is secured to line 15 while both lines are loose or sagging. The uprights are then raised by winding the drums, and as the drums which wind the line 15 are not locked said line will be raised by said uprights without becoming taut. When the uprights have been raised as far as the curtain will allow, the lower line 24 and upper line 15 are made taut, which stretches the curtain laterally, and as said curtain was secured to said lines when said lines were loose and sagging the tightening of said lines will straighten out the curtain and stretch the same longitudinally.

It will be noticed that the pulleys or rollers 7 and 8 at the tops of the uprights 1 and 2 act as friction-rollers for the movable uprights 3 and 4 and at the same time carry the cables 5 and 6.

Having thus described my invention, I do not wish to be understood as limiting myself to the exact construction herein set forth, as various slight changes may be made therein which would fall within the limit and scope of my invention, and I consider myself clearly entitled to all such changes and modifications.

What I claim as my invention, and desire to secure by Letters Patent of the United States, is—

1. In a clothes-line and curtain-stretcher, the combination of the main uprights, movable uprights carried thereby, a line carried by said movable uprights, winding-drums on said main uprights, said line being stretched by the raising of said uprights, and an independent winding-drum for stretching said line independent of the movement of said movable uprights.

2. In a clothes-line and curtain-stretcher, the combination of the main uprights, movable uprights carried thereby, a line carried on said main uprights and passing over said movable uprights, winding-drums for raising said movable uprights, and independent winding-drums for stretching said line.

3. In a clothes-line and curtain-stretcher, the combination with the main uprights of movable uprights carried therein, a line carried on said movable uprights means for raising said uprights, said raising means acting to reduce the friction of said movable uprights.

4. In a clothes-line and curtain-stretcher, the combination of main uprights, movable uprights, a line carried thereby, winding-drums for raising said movable uprights, and independent means carried on said main uprights for stretching said line when said uprights are in a raised or lowered position.

5. In a clothes-line and curtain-stretcher, the combination with main uprights, of movable uprights secured thereto, a line secured to said main uprights, a line carried on said movable uprights, means for stretching said lines, and means for raising said movable uprights, and line carried thereby.

6. In a clothes-line and curtain-stretcher, the combination of main uprights, movable uprights carried thereby, lines carried by said main and movable uprights adapted to be connected to a fabric at two edges thereof, and winding-drums for stretching said lines and fabric longitudinally and laterally.

In testimony whereof I affix my signature in presence of two witnesses.

THOMAS BRUSTER LEE.

Witnesses:
L. T. EVERETT,
HARRY KILGORE.